United States Patent
Saini et al.

(10) Patent No.: US 11,518,924 B2
(45) Date of Patent: *Dec. 6, 2022

(54) METHODS OF DISSOLVING GAS HYDRATES

(71) Applicant: Saudi Arabian Oil Company, Dhahran (SA)

(72) Inventors: Rajesh Kumar Saini, Cypress, TX (US); Mohammed Sayed, Houston, TX (US)

(73) Assignee: Saudi Arabian Oil Company, Dhahran (SA)

(*) Notice: Subject to any disclaimer, the term of this patent is extended or adjusted under 35 U.S.C. 154(b) by 0 days.

This patent is subject to a terminal disclaimer.

(21) Appl. No.: 17/090,138

(22) Filed: Nov. 5, 2020

(65) Prior Publication Data
US 2022/0135865 A1    May 5, 2022

(51) Int. Cl.
*C09K 8/52* (2006.01)

(52) U.S. Cl.
CPC ............ *C09K 8/52* (2013.01); *C09K 2208/22* (2013.01)

(58) Field of Classification Search
CPC ............................ C09K 8/52; C09K 2208/22
See application file for complete search history.

(56) References Cited

U.S. PATENT DOCUMENTS

| | | | |
|---|---|---|---|
| 4,330,037 A | 5/1982 | Richardson et al. | |
| 4,846,277 A | 7/1989 | Khalil et al. | |
| 6,035,933 A | 3/2000 | Khalil et al. | |
| 6,102,983 A | 8/2000 | Skaland | |
| 6,566,309 B1 | 5/2003 | Klug et al. | |
| 6,878,788 B2 | 4/2005 | Angel et al. | |
| 7,093,655 B2 * | 8/2006 | Atkinson | E21B 43/00 166/266 |
| 8,961,656 B2 | 2/2015 | Kang | |
| 9,145,465 B2 | 9/2015 | Spencer et al. | |
| 9,556,718 B2 | 1/2017 | Al-Dahlan et al. | |
| 9,803,133 B2 | 10/2017 | Al-Nakhli et al. | |
| 2008/0314124 A1 | 12/2008 | Sweeney et al. | |
| 2010/0018712 A1 * | 1/2010 | Tian | C09K 8/52 166/310 |
| 2012/0231977 A1 | 9/2012 | Mckennis et al. | |
| 2013/0130941 A1 | 5/2013 | Biggerstaff et al. | |
| 2015/0087562 A1 | 3/2015 | Falana et al. | |
| 2015/0300142 A1 | 10/2015 | Al-Nakhli et al. | |
| 2016/0312103 A1 | 10/2016 | Wahal et al. | |

FOREIGN PATENT DOCUMENTS

| | | | |
|---|---|---|---|
| CN | 101776209 A | 7/2010 | |
| CN | 105316053 A | 2/2016 | |
| CN | 110847871 A | 2/2020 | |
| EP | 909873 A2 | 4/1999 | |
| EP | 2336485 A2 | 6/2011 | |
| FR | 2652381 A1 * | 3/1991 | ......... E21B 43/2405 |
| WO | 2004106472 A1 | 12/2004 | |
| WO | 2008089262 A1 | 7/2008 | |
| WO | 2010045523 A1 | 4/2010 | |
| WO | 2011145950 A1 | 11/2011 | |
| WO | 2014105764 A1 | 7/2014 | |
| WO | 20140165347 A1 | 12/2014 | |

OTHER PUBLICATIONS

G. Y. Yevi et al, Storage of fuel in hydrate for natural gas vehicle (VGVs), Journal of Energy Resources Technology, 1996, 118, 209-213.*
Oen (K. Oen, An Experimental Study of Potassium Formate as a Potential Gas Hydrate Inhibitor in a Vertical Pipe, 2017).*
Fakher (SPE-192382-MS, year 2018).*
International Search Report and Written Opinion dated Jul. 30, 2021 received Aug. 11, 2021 pertaining to International application No. PCT/US2021/029314 filed Apr. 27, 2021.
U.S. Notice of Allowance dated Aug. 27, 2021 pertaining to U.S. Appl. No. 17/090,145, filed Nov. 5, 2020, 15 pages.
International Search Report and Written Opinion dated Feb. 9, 2022 pedaining to International application No. PCT/US2021/058223 filed Nov. 5, 2021, 14 pages.
Fadnes F. H. et al, "Studies on the Prevention of Gas Hydrates Formation in Pipelines using Potassium Formate as a Thermodynamic Inhibitor" Proceedings of the European Petroleum Conference, XX, XX, vol. 2, Oct. 20, 1998, pp. 497-506.
International Search Report and Written Opinion dated Feb. 9, 2022 pedaining to International application No. PCT/US2021/058222 filed Nov. 5, 2021, 16 pages.
Sayed, Mohammed A., et al. "Safer Dual-Functional Gas Hydrate Dissolver and Inhibitor to Replace Methanol" Energy & Fuels, vol. 35, No. 17, Aug. 16, 2021, pp. 13731-13742.
U.S. Office Action dated Dec. 8, 2021 pertaining to U.S. Appl. No. 17/090,142, filed Nov. 5, 2020, 20 pages.

* cited by examiner

*Primary Examiner* — Kumar R Bhushan
(74) *Attorney, Agent, or Firm* — Dinsmore & Shohl LLP

(57) ABSTRACT

A method of dissolving a gas hydrate in a pipeline includes introducing a gas hydrate dissolving solution into the pipeline and allowing the gas hydrate dissolving solution to at least partially dissolve the gas hydrate in the pipeline. The gas hydrate dissolving solution includes cesium formate, potassium formate, or both, and has a flash point of greater than 50° C.

20 Claims, 5 Drawing Sheets

METHODS OF DISSOLVING GAS HYDRATES

TECHNICAL FIELD

Embodiments of the present disclosure generally relate to methods of dissolving gas hydrates.

BACKGROUND

Gas hydrates are crystalline clathrate compounds of gas molecules in water, which form under specific temperature and pressure conditions (low temperature and high pressure). The water molecules form cage structures around the corresponding gas molecules. The framework formed from the water molecules is by itself thermodynamically unstable and is stabilized only by the inclusion of gas molecules, resulting in an ice-like compound which, depending on pressure and gas composition, can also exist above the freezing point of water (up to more than 25° C.).

In the petroleum and natural gas industry in particular, the gas hydrates which form from water and the natural gas components methane, ethane, propane, iso-butane, n-butane, nitrogen, carbon dioxide and hydrogen sulfide are of considerable importance. Particularly in present day natural gas production, the existence of these gas hydrates presents a major problem, especially when wet gas or multiphase mixtures comprising water, gas and alkane mixtures under high pressure are exposed to low temperatures. Here, owing to their insolubility and crystalline structure, the formation of gas hydrates leads to blockage of a very wide range of transport means, such as pipelines, valves or production systems in which wet gas or multiphase mixtures are transported over long distances at low temperatures, as occurs in particular in colder regions of the world or on the seabed.

SUMMARY

To avoid such problems, gas hydrates are conventionally dissolved, or gas hydrate formation is conventionally inhibited, by introducing methanol. The addition of methanol shifts the thermodynamic limit of gas hydrate formation to lower temperatures (thermodynamic inhibition). However, the addition of methanol gives rise to greater safety problems (flash point and toxicity of the alcohols), logistic problems (greater storage tanks, recycling of these solvents) and accordingly high costs, especially in offshore production.

Accordingly, a need exists for alternative additives to methanol that either dissolve gas hydrates or inhibit gas hydrate formation in pipelines. The alternative additives described in this disclosure at least partially dissolve gas hydrates, prevent the nucleation and/or the growth of gas hydrates, or modify the gas hydrate growth in such a way that smaller hydrate particles result.

In one embodiment, a method of at least partially dissolving a gas hydrate in a pipeline is provided. The method includes introducing a gas hydrate dissolving solution into the pipeline and allowing the gas hydrate dissolving solution to at least partially dissolve the gas hydrate in the pipeline. The gas hydrate dissolving solution includes cesium formate, potassium formate, or both, and has a flash point of greater than 50° C.

Additional features and advantages of the described embodiments will be set forth in the detailed description which follows, and in part will be readily apparent to those skilled in the art from that description or recognized by practicing the described embodiments, including the detailed description which follows as well as the claims.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
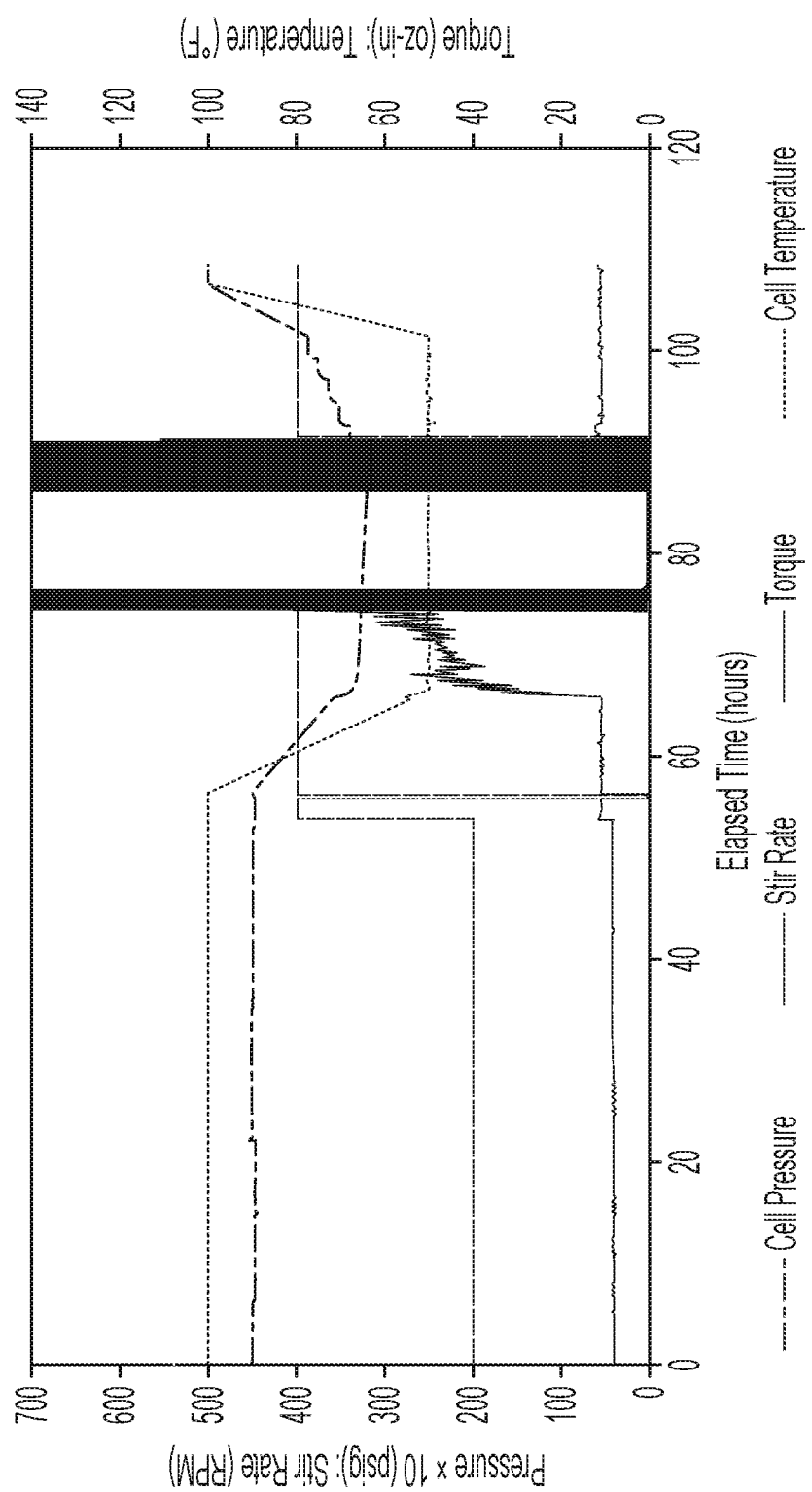
FIG. 1 graphically depicts the relationship between temperature, pressure, and torque (y-axis) and time (x-axis) during a gas hydrate experiment, according to one or more embodiments described in this disclosure.

As used throughout this disclosure, the term "gas hydrate" refers to a crystalline solid consisting of water with gas molecules in an ice-like cage structure. The general term for this type of solid is clathrate. Water molecules form a lattice structure into which many types of gas molecules can fit. Most gases, except hydrogen and helium, can form hydrates. $C_1$ to $C_5$ hydrocarbons, $H_2S$ and $CO_2$ form gas hydrates at low temperature and high pressure. Heavier hydrocarbons may also enter the structure but do not form gas hydrates by themselves.

As used throughout this disclosure, the term "pipeline" refers to a tube or system of tubes used for transporting or delivering hydrocarbon fluid from the bottom of the well to the wellhead on the surface, or transport the hydrocarbon from the wellhead or wellsite in the field to a gathering system or to an offsite location.

During production operations of oil and gas wells, low-molecular-weight hydrocarbons, such as methane, ethane, propane, n-butane and iso-butane, and sometimes other low-molecular-weight species such as $CO_2$ and $H_2S$, are normally present in pipelines or other conduits used in the transportation and processing of natural gas and crude oil. When a flowing hydrocarbon fluid is subjected to low temperatures or elevated pressures in the presence of free water, gas hydrate crystals typically are formed. In these circumstances, a gas hydrate blockage or partial blockage may form in the pipeline. This gas hydrate may be remediated through the application of thermodynamic hydrate inhibitors/dissolvers which contact the hydrate accumulation directly, melt or extract water therefrom, and thereby remove the blockage from the pipeline.

Gas hydrates are clathrates (inclusion compounds) in which small hydrocarbon molecules are trapped in a lattice consisting of water molecules. Hydrates form as a consequence of the tendency of water to reorient in the presence of a non-polar solute (typically light hydrocarbon gases such as methane) to stabilize the lattice through, typically, van der Waals interactions while maintaining the hydrogen bonding between the water molecules. Hydrate formation inside a conduit such as a pipeline is undesirable because the crystals might cause plugging of flow lines, valves and instrumentation, reducing line capacity and/or causing physical damage to pipelines and equipment. The gas hydrate blockages may separate a pipe into two zones where one zone has a greater pressure than the second zone, separated by the gas hydrate blockage. If the blockage is suddenly cleared, a projectile may be generated which may cause damage to the pipeline and any surrounding infrastructure.

In order to remedy this undesired phenomenon, the addition of inhibiting agents such as melting point depressants may dissolve the gas hydrate without suddenly dislodging the gas hydrate. Methanol is conventionally used as melting point depressants to dissolve gas hydrates. However, the volume of methanol needed to effectively dissolve the gas hydrate may far exceed the amount required to sufficiently dilute the melt water. Additionally, methanol has a low flash point temperature (approximately 12° C.), rendering it unsafe to be stored in large volumes in areas where the ambient temperature exceeds 10° C. and also during pumping as it can catch fire due to static electric build up or due to heat generated in pumping equipment during pumping.

Embodiments of the present disclosure relate to methods of dissolving gas hydrates in pipelines. Gas hydrates may form in a pipeline having a pressure greater than 500 pounds per square inch (psi) and a temperature less than 100° F. In embodiments, the pipeline may have a pressure of greater than 500 psi, greater than 1000 psi, greater than 1500 psi, greater than 2000 psi, greater than 2200 psi, greater than 2500 psi, greater than 3000 psi, greater than 5000 psi, or greater than 10,000 psi. The pipeline may have a pressure of from 500 to 10000 psi, from 500 to 5000 psi, from 500 to 3000 psi, from 500 to 2500 psi, from 500 to 2200 psi, from 500 to 2000 psi, from 500 to 1500 psi, from 500 to 1000 psi, from 1000 to 10000 psi, from 1000 to 5000 psi, from 1000 to 3000 psi, from 1000 to 2500 psi, from 1000 to 2200 psi, from 1000 to 2000 psi, from 1000 to 1500 psi, from 1500 to 10000 psi, from 1500 to 5000 psi, from 1500 to 3000 psi, from 1500 to 2500 psi, from 1500 to 2200 psi, from 1500 to 2000 psi, from 2000 to 10000 psi, from 2000 to 5000 psi, from 2000 to 3000 psi, from 2000 to 2500 psi, from 2000 to 2200 psi, from 2200 to 3000 psi, from 2200 to 2500 psi, from 2500 to 3000 psi, from 3000 to 10000 psi, from 3000 to 5000 psi, or from 5000 to 10000 psi. In embodiments, the pipeline may have a temperature of less than 200° F., less than 150° F., less than 110° F., less than 100° F., less than 95° F., less than 90° F., less than 85° F., less than 80° F., less than 70° F., less than 60° F., less than 50° F., less than 35° F., less than 30° F., or less than 10° F. The gas hydrate may include free water, carbon dioxide, hydrogen sulfide, lower molecular weight gaseous hydrocarbons such as methane, ethane, propane, iso-butane and n-butane, fresh water, formation brine or combinations thereof. The free water may be water encapsulated within the gas hydrate.

Methods of dissolving a gas hydrate in a pipeline may include introducing a gas hydrate dissolving solution into the pipeline and allowing the gas hydrate dissolving solution to at least partially dissolve the gas hydrate in the pipeline. The gas hydrate dissolving solution may include a glycol, dimethylformamide, or both. The gas hydrate dissolving solution may include cesium formate, potassium formate, or both. The gas hydrate dissolving solution may include cesium formate, potassium formate, sodium formate, potassium acetate, sodium chloride, calcium chlorides, magnesium chloride, sodium acetate, calcium magnesium acetate, calcium nitrate, calcium nitrate, magnesium nitrate, calcium magnesium nitrate, potassium carbonates, carbamide (available from Urea Solutions), sodium lactate; potassium lactate; a mixture of sodium lactate and potassium lactate; a hydroxyl-containing organic compound in combination with sodium lactate, potassium lactate and/or potassium acetate; a mixture of sodium lactate and/or potassium lactate with potassium acetate; or potassium carbonate, ammonium carbonate, ammonium carbamate, ammonium acetate, or combinations thereof. The gas hydrate dissolving solution may include alkali and alkaline earth metal salts including formates, lactates, acetates, carbonates, chlorides, or combinations thereof. The gas hydrate dissolving solution may include ammonium salts such as ammonium acetate, carbonate, carbamate, or combinations thereof.

In embodiments, gas hydrates may form in pipelines where hydrocarbon fluid is flowing. Specifically, in embodiments, hydrocarbon fluid may be flowing through the pipeline when introducing the gas hydrate dissolving solution. The hydrocarbon fluid may include methane, ethane, propane, butane, pentane, hexane, heptane, octane, nonane, carbon dioxide, hydrogen sulfide, dinitrogen, fresh water, formation brine, or combinations of these.

Introducing the gas hydrate dissolving solution may include introducing from 1 to 40 volume percent (vol. %) gas hydrate dissolving solution, based on a total volume of water within the hydrocarbon fluid in the pipeline. In embodiments, introducing the gas hydrate dissolving solution may include introducing from 5 to 200 vol. %, from 5 to 100 vol. %, from 5 to 70 vol. %, from 5 to 50 vol. %, from 5 to 45 vol. %, from 5 to 40 vol. %, from 5 to 35 vol. %, from 5 to 30 vol. %, from 5 to 25 vol. %, from 5 to 20 vol. %, from 5 to 15 vol. %, from 5 to 10 vol. %, from 10 to 200 vol. %, from 10 to 100 vol. %, from 10 to 70 vol. %, from 10 to 50 vol. %, from 10 to 45 vol. %, from 10 to 40 vol. %, from 10 to 35 vol. %, from 10 to 30 vol. %, from 10 to 25 vol. %, from 10 to 20 vol. %, from 10 to 15 vol. %, from 15 to 200 vol. %, from 15 to 100 vol. %, from 15 to 70 vol. %, from 15 to 50 vol. %, from 15 to 45 vol. %, from 15 to 40 vol. %, from 15 to 35 vol. %, from 15 to 30 vol. %, from 15 to 25 vol. %, from 15 to 20 vol. %, from 20 to 200 vol. %, from 20 to 100 vol. %, from 20 to 70 vol. %, from 20 to 50 vol. %, from 20 to 45 vol. %, from 20 to 40 vol. %, from 20 to 35 vol. %, from 20 to 30 vol. %, from 20 to 25 vol. %, from 25 to 200 vol. %, from 25 to 100 vol. %, from 25 to 70 vol. %, from 25 to 50 vol. %, from 25 to 45 vol. %, from 25 to 40 vol. %, from 25 to 35 vol. %, from 25 to 30 vol. %, from 30 to 200 vol. %, from 30 to 100 vol. %, from 30 to 70 vol. %, from 30 to 50 vol. %, from 30 to 45 vol. %, from 30 to 40 vol. %, from 30 to 35 vol. %, from 35 to 200 vol. %, from 35 to 100 vol. %, from 35 to 70 vol. %, from 35 to 50 vol. %, from 35 to 45 vol. %, from 35 to 40 vol. %, from 40 to 200 vol. %, from 40 to 100 vol. %, from 40 to 70 vol. %, from 40 to 50 vol. %, from 40 to 45 vol. %, from 45 to 200 vol. %, from 45 to 100 vol. %, from 45 to 70 vol. %, from 45 to 50 vol. %, from 50 to 200 vol. %, from 50 to 100 vol. %, from 50 to 70 vol. %, from 70 to 200 vol. %, from 70 to 100 vol. %, or from 100 to 200 vol. % of the gas hydrate dissolving solution, based on a total volume of water within the hydrocarbon fluid in the pipeline. In embodiments, introducing the gas hydrate dissolving solution may include introducing from 5 to 30 vol. % of the gas hydrate dissolving solution, based on a total volume of water within the hydrocarbon fluid in the pipeline.

In embodiments, introducing the gas hydrate dissolving solution includes introducing from 1 to 7 injections of the gas hydrate dissolving solution into the pipeline. A first injection may include from 5 to 15 vol. % of the gas hydrate dissolving solution, based on a total volume of water within the hydrocarbon fluid in the pipeline. In embodiments, the first injection may include from 2 to 20 vol. %, from 2 to 15 vol. %, from 2 to 12.5 vol. %, from 2 to 11 vol. %, from 2 to 10 vol. %, from 2 to 9 vol. %, from 2 to 7.5 vol. %, from 2 to 5 vol. %, from 5 to 20 vol. %, from 5 to 15 vol. %, from 5 to 12.5 vol. %, from 5 to 11 vol. %, from 5 to 10 vol. %, from 5 to 9 vol. %, from 5 to 7.5 vol. %, from 7.5 to 20 vol. %, from 7.5 to 15 vol. %, from 7.5 to 12.5 vol. %, from 7.5 to 11 vol. %, from 7.5 to 10 vol. %, from 7.5 to 9 vol. %, from 9 to 20 vol. %, from 9 to 15 vol. %, from 9 to 12.5 vol. %, from 9 to 11 vol. %, from 9 to 10 vol. %, from 10 to 20 vol. %, from 10 to 15 vol. %, from 10 to 12.5 vol. %, from 10 to 11 vol. %, from 11 to 20 vol. %, from 11 to 15 vol. %, from 11 to 12.5 vol. %, from 12.5 to 20 vol. %, from 12.5 to 15 vol. %, or from 15 to 20 vol. % of the gas hydrate dissolving solution, based on a total volume of water within the hydrocarbon fluid in the pipeline.

After introducing the first injection, additional injections may be introduced into the pipeline. There may be from 1 to 20, from 1 to 15, from 1 to 10, from 1 to 8, from 1 to 7, from 1 to 6, from 1 to 5, from 1 to 4, from 1 to 3, from 1 to 2, from 2 to 20, from 2 to 15, from 2 to 10, from 2 to 8, from 2 to 7, from 2 to 6, from 2 to 5, from 2 to 4, from 2 to 3, from 3 to 20, from 3 to 15, from 3 to 10, from 3 to 8, from 3 to 7, from 3 to 6, from 3 to 5, from 3 to 4, from 4 to 20, from 4 to 15, from 4 to 10, from 4 to 8, from 4 to 7, from 4 to 6, from 4 to 5, from 5 to 20, from 5 to 15, from 5 to 10, from 5 to 8, from 5 to 7, from 5 to 6, from 6 to 20, from 6 to 15, from 6 to 10, from 6 to 8, from 6 to 7, from 7 to 20, from 7 to 15, from 7 to 10, from 7 to 8, from 8 to 20, from 8 to 15, from 8 to 10, from 10 to 20, from 10 to 15, or from 15 to 20 additional injections.

Each remaining injection may include from 3 to 7 vol. % of the gas hydrate dissolving solution, based on a total volume of water within the hydrocarbon fluid in the pipeline. In embodiments, each remaining injection may include from 2 to 10 vol. %, from 2 to 8 vol. %, from 2 to 7 vol. %, from 2 to 6 vol. %, from 2 to 5 vol. %, from 2 to 4 vol. %, from 2 to 3 vol. %, from 3 to 10 vol. %, from 3 to 8 vol. %, from 3 to 7 vol. %, from 3 to 6 vol. %, from 3 to 5 vol. %, from 3 to 4 vol. %, from 4 to 10 vol. %, from 4 to 8 vol. %, from 4 to 7 vol. %, from 4 to 6 vol. %, from 4 to 5 vol. %, from 5 to 10 vol. %, from 5 to 8 vol. %, from 5 to 7 vol. %, from 5 to 6 vol. %, from 6 to 10 vol. %, from 6 to 8 vol. %, from 6 to 7 vol. %, from 7 to 10 vol. %, from 7 to 8 vol. %, or from 8 to 10 vol. % of the gas hydrate dissolving solution, based on a total volume of water within the hydrocarbon fluid in the pipeline.

As stated previously, the gas hydrate dissolving solution may include a glycol, dimethylformamide, or both. The gas hydrate dissolving solution may include cesium formate, potassium formate, or both. The gas hydrate dissolving solution may include cesium formate, potassium formate, sodium formate, potassium acetate, sodium chloride, calcium chlorides, magnesium chloride, sodium acetate, calcium magnesium acetate, calcium nitrate, calcium nitrate, magnesium nitrate, calcium magnesium nitrate, potassium carbonates, carbamide (available from Urea Solutions), sodium lactate; potassium lactate; a mixture of sodium lactate and potassium lactate; a hydroxyl-containing organic compound in combination with sodium lactate, potassium lactate and/or potassium acetate; a mixture of sodium lactate and/or potassium lactate with potassium acetate; or potassium carbonate, ammonium carbonate, ammonium carbamate, ammonium acetate, or combinations thereof. The gas hydrate dissolving solution may include alkali and alkaline earth metal salts including formates, lactates, acetates, carbonates, chlorides, or combinations thereof. The gas hydrate dissolving solution may include ammonium salts such as ammonium acetate, carbonate, carbamate, or combinations thereof. In embodiments, the gas hydrate dissolving solution may include dimethylformamide or may consist of dimethylformamide. In embodiments, the gas hydrate dissolving solution may include glycol or may consist of glycol. The glycol may be chosen from the group consisting of ethylene glycol monomethyl ether, diethylene glycol monomethyl ether, ethylene glycol monobutyl ether, diethylene glycol monoethyl ether, 2-butoxyethanol, and propylene glycol. In embodiments, the gas hydrate dissolving solution may include 2(2-ethoxyethoxy)ethanol or diethylene glycol monoethyl ether, 2-butoxyethanol or ethylene glycol monobutyl ether, 2(2-methoxyethoxy)ethanol or diethyleneglycol monomethyl ether, dimethylformamide, propylene glycol or 1,2 propylene glycol or 1,2-propanediol, a mixture of ethylene glycol and water (EG/35% water), 1,3 butanediol, propylene carbonate, mixture of 60% propylene glycol in water, a mixture of ethylene glycol in water (50% EG in water), 1,3 propylene glycol, ethylene glycol, diethylene glycol, tri-ethylene glycol, diglyme, diethylene glycol dimethyl ether, or combinations thereof.

The gas hydrate dissolving solution may have a boiling point of greater than 80° C. In embodiments, the gas hydrate dissolving solution may have a boiling point of greater than 80° C., 85° C., 90° C., 95° C., 100° C., 105° C., 110° C., 120° C., 150° C., or 200° C. In embodiments, the gas hydrate dissolving solution may have a boiling point of from 80° C. to 200° C., from 80° C. to 150° C., from 80° C. to 120° C., from 80° C. to 110° C., from 80° C. to 105° C., from 80° C. to 100° C., from 80° C. to 95° C., from 80° C. to 90° C., from 80° C. to 85° C., from 85° C. to 200° C., from 85° C. to 150° C., from 85° C. to 120° C., from 85° C. to 110° C., from 85° C. to 105° C., from 85° C. to 100° C., from 85° C. to 95° C., from 85° C. to 90° C., from 90° C. to 200° C., from 90° C. to 150° C., from 90° C. to 120° C., from 90° C. to 110° C., from 90° C. to 105° C., from 90° C. to 100° C., from 90° C. to 95° C., from 95° C. to 200° C., from 95° C. to 150° C., from 95° C. to 120° C., from 95° C. to 110° C., from 95° C. to 105° C., from 95° C. to 100° C., from 100° C. to 200° C., from 100° C. to 150° C., from 100° C. to 120° C., from 100° C. to 110° C., from 100° C. to 105° C., from 105° C. to 200° C., from 105° C. to 150° C., from 105° C. to 120° C., from 105° C. to 110° C., from 110° C. to 200° C., from 110° C. to 150° C., from 110° C. to 120° C., from 120° C. to 200° C., from 120° C. to 150° C., or from 150° C. to 200° C. The gas hydrate dissolving solution may include a glycol, dimethylformamide, or both, and may have a boiling point as described previously. The gas hydrate dissolving solution may include a glycol, dimethylformamide, or both, and have a boiling point as described previously. The gas hydrate dissolving solution may include cesium formate, potassium formate, and have a boiling point as described previously. The gas hydrate dissolving solution may include cesium formate, potassium formate, sodium formate, potassium acetate, sodium chloride, calcium chlorides, magnesium chloride, sodium acetate, calcium magnesium acetate, calcium nitrate, calcium nitrate, magnesium nitrate, calcium magnesium nitrate, potassium carbonates, carbamide (available from Urea Solutions), sodium lactate; potassium lactate; a mixture of sodium lactate and potassium lactate; a hydroxyl-containing organic compound in combination with sodium lactate, potassium lactate and/or potassium acetate; a mixture of sodium lactate and/or potassium lactate with potassium acetate; or potassium carbonate, ammonium carbonate, ammonium carbamate, ammonium acetate, or combinations thereof, and may have a boiling point as described previously. The gas hydrate dissolving solution may include alkali and alkaline earth metal salts including formates, lactates, acetates, carbonates, chlorides, or combinations thereof. The gas hydrate dissolving solution may include ammonium salts such as ammonium acetate, carbonate, carbamate, or combinations thereof, and have a boiling point as described previously.

The gas hydrate dissolving solution may have a flash point of greater than 50° C. In embodiments, the gas hydrate dissolving solution may have a flash point of greater than 50° C., greater than 55° C., greater than 60° C., greater than 65° C., greater than 70° C., greater than 75° C., greater than 80° C., greater than 85° C., greater than 90° C., greater than 100° C., greater than 120° C., or greater than 150° C. In embodiments, the gas hydrate dissolving solution may have a flash point of from 50° C. to 150° C., from 50° C. to 120° C., from 50° C. to 100° C., from 50° C. to 90° C., from 50° C. to 85° C., from 50° C. to 80° C., from 50° C. to 75° C., from 50° C. to 70° C., from 50° C. to 65° C., from 50° C. to 60° C., from 50° C. to 55° C., from 55° C. to 150° C., from 55° C. to 120° C., from 55° C. to 100° C., from 55° C. to 90° C., from 55° C. to 85° C., from 55° C. to 80° C., from 55° C. to 75° C., from 55° C. to 70° C., from 55° C. to 65° C., from 55° C. to 60° C., from 60° C. to 150° C., from 60° C. to 120° C., from 60° C. to 100° C., from 60° C. to 90° C., from 60° C. to 85° C., from 60° C. to 80° C., from 60° C. to 75° C., from 60° C. to 70° C., from 60° C. to 65° C., from 65° C. to 150° C., from 65° C. to 120° C., from 65° C. to 100° C., from 65° C. to 90° C., from 65° C. to 85° C., from 65° C. to 80° C., from 65° C. to 75° C., from 65° C. to 70° C., from 70° C. to 150° C., from 70° C. to 120° C., from 70° C. to 100° C., from 70° C. to 90° C., from 70° C. to 85° C., from 70° C. to 80° C., from 70° C. to 75° C., from 75° C. to 150° C., from 75° C. to 120° C., from 75° C. to 100° C., from 75° C. to 90° C., from 75° C. to 85° C., from 75° C. to 80° C., from 80° C. to 150° C., from 80° C. to 120° C., from 80° C. to 100° C., from 80° C. to 90° C., from 80° C. to 85° C., from 85° C. to 150° C., from 85° C. to 120° C., from 85° C. to 100° C., from 85° C. to 90° C., from 90° C. to 150° C., from 90° C. to 120° C., from 90° C. to 100° C., from 100° C. to 150° C., from 100° C. to 120° C., or from 120° C. to 150° C. The gas hydrate dissolving solution may include a glycol, dimethylformamide, or both, and have a flash point as described previously. The gas hydrate dissolving solution may include cesium formate, potassium formate, and have a flash point as described previously. The gas hydrate dissolving solution may include cesium formate, potassium formate, sodium formate, potassium acetate, sodium chloride, calcium chlorides, magnesium chloride, sodium acetate, calcium magnesium acetate, calcium nitrate, calcium nitrate, magnesium nitrate, calcium magnesium nitrate, potassium carbonates, carbamide (available from Urea Solutions), sodium lactate; potassium lactate; a mixture of sodium lactate and potassium lactate; a hydroxyl-containing organic compound in combination with sodium lactate, potassium lactate and/or potassium acetate; a mixture of sodium lactate and/or potassium lactate with potassium acetate; or potassium carbonate, ammonium carbonate, ammonium carbamate, ammonium acetate, or combinations thereof, and may have a flash point as described previously. The gas hydrate dissolving solution may include alkali and alkaline earth metal salts including formates, lactates, acetates, carbonates, chlorides, or combinations thereof. The gas hydrate dissolving solution may include ammonium salts such as ammonium acetate, carbonate, carbamate, or combinations thereof, and have a flash point as described previously.

The gas hydrate dissolving solution may have a melting point of less than −15° C. If the gas hydrate dissolving solution includes sodium formate, the melting point may be less than −15° C., or may be approximately −16° C. If the gas hydrate dissolving solution includes sodium formate, with a melting point less than −15° C., or approximately −16° C., the gas hydrate dissolving solution may include from 10 to 30 wt. %, from 10 to 25 wt. %, from 10 to 22 wt. %, from 15 to 30 wt. %, from 15 to 25 wt. %, from 15 to 22 wt. %, from 17 to 30 wt. %, from 17 to 25 wt. %, from 17 to 22 wt. %, or approximately 20 wt. % sodium formate by a weight of the gas hydrate dissolving solution. The gas hydrate dissolving solution may have a melting point of less than −20° C. The gas hydrate dissolving solutions having a melting point of less than −20° C. may include diluted cesium formats, diluted potassium formats, or both. If the gas hydrate dissolving solution includes sodium chloride, the melting point may be less than −20° C., or may be approximately −21° C. If the gas hydrate dissolving solution includes calcium magnesium acetate, the melting point may be less than −20° C., less than −25° C., or may be approximately −28° C. The gas hydrate dissolving solution may have a melting point of less than −50° C. In embodiments, the gas hydrate dissolving solution may have a melting point of less than −15° C., less than −20° C., less than −30° C., less than −40° C., less than −50° C., less than −55° C., less than −60° C., less than −65° C., less than −70° C., less than −75° C., less than −80° C., less than −85° C., less than −90° C., less than −100° C., less than −120° C., or less than −150° C. In embodiments, the gas hydrate dissolving solution may have a melting point of from −15° C. to −150° C., from −15° C. to −120° C., from −15° C. to −100° C., from −15° C. to −90° C., from −15° C. to −85° C., from −15° C. to −80° C., from −15° C. to −75° C., from −15° C. to −70° C., from −15° C. to −65° C., from −15° C. to −60° C., from −15° C. to −55° C., from −15° C. to −50° C., from −15° C. to −40° C., from −15° C. to −30° C., from −15° C. to −25° C., from −15° C. to −20° C., from −20° C. to −200° C., from −20° C. to −120° C., from −20° C. to −100° C., from −20° C. to −90° C., from −20° C. to −85° C., from −20° C. to −80° C., from −20° C. to −75° C., from −20° C. to −70° C., from −20° C. to −65° C., from −20° C. to −60° C., from −20° C. to −55° C., from −20° C. to −50° C., from −20° C. to −40° C., from −20° C. to −30° C., from −20° C. to −25° C., from −30° C. to −300° C., from −30° C. to −120° C., from −30° C. to −100° C., from −30° C. to −90° C., from −30° C. to −85° C., from −30° C. to −80° C., from −30° C. to −75° C., from −30° C. to −70° C., from −30° C. to −65° C., from −30° C. to −60° C., from −30° C. to −55° C., from −30° C. to −50° C., from −30° C. to −40° C., from −40° C. to −400° C., from −40° C. to −120° C., from −40° C. to −100° C., from −40° C. to −90° C., from −40° C. to −85° C., from −40° C. to −80° C., from −40° C. to −75° C., from −40° C. to −70° C., from −40° C. to −65° C., from −40° C. to −60° C., from −40° C. to −55° C., from −40° C. to −50° C., from −50° C. to −150° C., from −50° C. to −120° C., from −50° C. to −100° C., from −50° C. to −90° C., from −50° C. to −85° C., from −50° C. to −80° C., from −50° C. to −75° C., from −50° C. to −70° C., from −50° C. to −65° C., from −50° C. to −60° C., from −50° C. to −55° C., from −55° C. to −150° C., from −55° C. to −120° C., from −55° C. to −100° C., from −55° C. to −90° C., from −55° C. to −85° C., from −55° C. to −80° C., from −55° C. to −75° C., from −55° C. to −70° C., from −55° C. to −65° C., from −55° C. to −60° C., from −60° C. to −150° C., from −60° C. to −120° C., from −60° C. to −100° C., from −60° C. to −90° C., from −60° C. to −85° C., from −60° C. to −80° C., from −60° C. to −75° C., from −60° C. to −70° C., from −60° C. to −65° C., from −65° C. to −150° C., from −65° C. to −120° C., from −65° C. to −100° C., from −65° C. to −90° C., from −65° C. to −85° C., from −65° C. to −80° C., from −65° C. to −75° C., from −65° C. to −70° C., from −70° C. to −150° C., from −70° C. to −120° C., from −70° C. to −100° C., from −70° C. to −90° C., from −70° C. to −85° C., from −70° C. to −80° C., from −70° C. to −75° C., from −75° C. to −150° C., from −75° C. to −120° C., from −75° C. to −100° C., from −75° C. to −90° C., from −75° C. to −85° C., from −75° C. to −80° C., from −80° C. to −150° C., from −80° C. to −120° C., from −80° C. to −100° C., from −80° C. to −90° C., from −80° C. to −85° C., from −85° C. to −150° C., from −85° C. to −120° C., from −85° C. to −100° C., from −85° C. to −90° C., from −90° C. to −150° C., from −90° C. to −120° C., from −90° C. to −100° C., from −100° C. to −150° C., from −100° C. to −120° C., or from −120° C. to −150° C. The gas hydrate dissolving solution may include a glycol, dimethylformamide, or both, and have a melting point as described previously. The gas hydrate dissolving solution may include cesium formate, potassium formate, and have a melting point as described previously. The gas hydrate dissolving solution may include cesium formate, potassium formate, sodium formate, potassium acetate, sodium chloride, calcium chlorides, magnesium chloride, sodium acetate, calcium magnesium acetate, calcium nitrate, calcium nitrate, magnesium nitrate, calcium magnesium nitrate, potassium carbonates, carbamide (available from Urea Solutions), sodium lactate; potassium lactate; a mixture of sodium lactate and potassium lactate; a hydroxyl-containing organic compounds compound in combination with sodium lactate, potassium lactate and/or potassium acetate; a mixture of sodium lactate and/or potassium lactate with potassium acetate; or potassium carbonate, ammonium carbonate, ammonium carbamate, ammonium acetate, or combinations thereof, and may have a boiling point as described previously. The gas hydrate dissolving solution may include alkali and alkaline earth metal salts including formates, lactates, acetates, carbonates, chlorides, or combinations thereof. The gas hydrate dissolving solution may include ammonium salts such as ammonium acetate, carbonate, carbamate, or combinations thereof, and have a melting point as described previously.

When the gas hydrate dissolving solution includes 2-butoxyethanol, introducing the gas hydrate dissolving solution may include introducing from 12 to 18 vol. % gas hydrate dissolving solution, based on a total volume of water within the hydrocarbon fluid in the pipeline. In embodiments, the method may include introducing from 10 to 20 vol. %, from 10 to 18 vol. %, from 10 to 16 vol. %, from 10 to 15 vol. %, from 10 to 14 vol. %, from 10 to 12 vol. %, from 12 to 20 vol. %, from 12 to 18 vol. %, from 12 to 16 vol. %, from 12 to 15 vol. %, from 12 to 14 vol. %, from 14 to 20 vol. %, from 14 to 18 vol. %, from 14 to 16 vol. %, from 14 to 15 vol. %, from 15 to 20 vol. %, from 15 to 18 vol. %, from 15 to 16 vol. %, from 16 to 20 vol. %, from 16 to 18 vol. %, or from 18 to 20 vol. % gas hydrate dissolving solution, based on a total volume of water within the hydrocarbon fluid in the pipeline.

When the gas hydrate dissolving solution includes 2-butoxyethanol, introducing the gas hydrate dissolving solution may include introducing from 4 to 8 injections of the gas hydrate dissolving solution, in which each injection is from 1 to 4 vol. % gas hydrate dissolving solution, based on a total volume of water within the hydrocarbon fluid in the pipeline. In embodiments, the method may include introducing from 2 to 10, from 2 to 8, from 2 to 6, from 2 to 5, from 2 to 4, from 4 to 10, from 4 to 8, from 4 to 6, from 4 to 5, from 5 to 10, from 5 to 8, from 5 to 6, from 6 to 10, from 6 to 8, or from 8 to 10 injections of the gas hydrate dissolving solution. In embodiments, each injection may be from 1 to 4 vol. %, from 1 to 3 vol. %, from 1 to 2.5 vol. %, from 1 to 2 vol. %, from 2 to 4 vol. %, from 2 to 3 vol. %, from 2 to 2.5 vol. %, from 2.5 to 4 vol. %, from 2.5 to 3 vol. %, or from 3 to 4 vol. % gas hydrate dissolving solution, based on a total volume of water within the hydrocarbon fluid in the pipeline.

The gas hydrate dissolving solution may be introduced into the pipeline at an injection rate of from 0.5 to 20 gallons per minute (gal/min), from 0.5 to 15 gal/min, from 0.5 to 11 gal/min, from 0.5 to 7 gal/min, from 0.5 to 5 gal/min, from 1 to 20 gal/min, from 1 to 15 gal/min, from 1 to 11 gal/min, from 1 to 7 gal/min, from 1 to 5 gal/min, from 2 to 20 gal/min, from 2 to 15 gal/min, from 2 to 11 gal/min, from 2 to 7 gal/min, from 2 to 5 gal/min, from 3 to 20 gal/min, from 3 to 15 gal/min, from 3 to 11 gal/min, from 3 to 7 gal/min, or from 3 to 5 gal/min.

The gas hydrate dissolving solution may include an aqueous solution including the glycol, dimethylformamide, or both. The gas hydrate dissolving solution may include an aqueous solution including the cesium formate, potassium formate, or both. The gas hydrate dissolving solution may include an aqueous solution including the cesium formate, potassium formate, sodium formate, potassium acetate, sodium chloride, calcium chlorides, magnesium chloride, sodium acetate, calcium magnesium acetate, calcium nitrate, calcium nitrate, magnesium nitrate, calcium magnesium nitrate, potassium carbonates, carbamide (available from Urea Solutions), sodium lactate; potassium lactate; a mixture of sodium lactate and potassium lactate; a hydroxyl-containing organic compounds compound in combination with sodium lactate, potassium lactate and/or potassium acetate; a mixture of sodium lactate and/or potassium lactate with potassium acetate; or potassium carbonate, ammonium carbonate, ammonium carbamate, ammonium acetate, or combinations thereof. The gas hydrate dissolving solution may include an aqueous solution including the alkali and alkaline earth metal salts including formates, lactates, acetates, carbonates, chlorides, or combinations thereof. The gas hydrate dissolving solution may include an aqueous solution including the ammonium salts such as ammonium acetate, carbonate, carbamate, or combinations thereof.

The aqueous phase may include at least one of fresh water, salt water, brine, formation water, produced water, well water, filtered water, distilled water, sea water, or combinations thereof. The brine may include at least one of natural and synthetic brine, such as saturated brine or formate brine. The aqueous phase may use water containing organic compounds or salt. Without being bound by any particular theory, salt or other organic compounds may be incorporated into the aqueous phase to control the density of the gas hydrate dissolving solution. Suitable salts include but are not limited to alkali metal chlorides, hydroxides, lactates, carbonates, nitrates, acetates, formates or carboxylates. In some embodiments, suitable salts may include sodium, calcium, cesium, zinc, aluminum, magnesium, potassium, strontium, silicon, lithium, chlorides, bromides, carbonates, iodides, chlorates, bromates, formates, nitrates, sulfates, phosphates, oxides, fluorides and combinations of these. In some particular embodiments, brine may be used in the aqueous phase.

In some embodiments, the gas hydrate dissolving solution may contain from 10 weight percent (wt. %) to 70 wt. % of the aqueous phase based on the total weight of the gas hydrate dissolving solution. In some embodiments, the gas hydrate dissolving solution may contain from 28 pounds per barrel (lb/bbl) to 630 lbs/bbl, such as from 30 to 600 lbs/bbl, from 50 to 500 lbs/bbl, from 100 to 500 lb/bbl, 200 to 500 lbs/bbl, or 300 to 600 lbs/bbl of the aqueous phase.

As stated previously, the method includes allowing the gas hydrate dissolving solution to at least partially dissolve the gas hydrate in the pipeline. The gas hydrate dissolving solution may at least partially dissolve the gas hydrate in the pipeline in less than 10 hours, less than 8 hours, less than 7 hours, less than 6 hours, less than 5 hours, less than 4 hours, less than 3 hours, less than 2 hours, or less than 1 hour. In embodiments, the gas hydrate dissolving solution may at least partially dissolve the gas hydrate in the pipeline in from 1 to 10 hours, from 1 to 8 hours, from 1 to 7 hours, from 1 to 6 hours, from 1 to 5 hours, from 1 to 4 hours, from 1 to 3 hours, from 1 to 2 hours, from 2 to 10 hours, from 2 to 8 hours, from 2 to 7 hours, from 2 to 6 hours, from 2 to 5 hours, from 2 to 4 hours, from 2 to 3 hours, from 3 to 10 hours, from 3 to 8 hours, from 3 to 7 hours, from 3 to 6 hours, from 3 to 5 hours, from 3 to 4 hours, from 4 to 10 hours, from 4 to 8 hours, from 4 to 7 hours, from 4 to 6 hours, from 4 to 5 hours, from 5 to 10 hours, from 5 to 8 hours, from 5 to 7 hours, from 5 to 6 hours, from 6 to 10 hours, from 6 to 8 hours, from 6 to 7 hours, from 7 to 10 hours, from 7 to 8 hours, or from 8 to 10 hours.

The method may further include heating the gas hydrate dissolving solution prior to introducing the gas hydrate dissolving solution into the pipeline. The gas hydrate dissolving solution may be heated to at least 100° F., at least 125° F., at least 150° F., at least 175° F., at least 200° F., at least 225° F., at least 250° F., at least 275° F., at least 300° F., or at least 350° F. In embodiments, the gas hydrate dissolving solution may be heated to from 100° F. to 350° F., from 100° F. to 300° F., from 100° F. to 275° F., from 100° F. to 250° F., from 100° F. to 225° F., from 100° F. to 200° F., from 100° F. to 175° F., from 100° F. to 150° F., from 100° F. to 125° F., from 125° F. to 350° F., from 125° F. to 300° F., from 125° F. to 275° F., from 125° F. to 250° F., from 125° F. to 225° F., from 125° F. to 225° F., from 125° F. to 200° F., from 125° F. to 175° F., from 125° F. to 150° F., from 150° F. to 350° F., from 150° F. to 300° F., from 150° F. to 275° F., from 150° F. to 250° F., from 150° F. to 225° F., from 150° F. to 200° F., from 150° F. to 175° F., from 175° F. to 350° F., from 175° F. to 300° F., from 175° F. to 275° F., from 175° F. to 250° F., from 175° F. to 225° F., from 175° F. to 200° F., from 200° F. to 350° F., from 200° F. to 300° F., from 200° F. to 275° F., from 200° F. to 250° F., from 200° F. to 225° F., from 225° F. to 350° F., from 225° F. to 300° F., from 225° F. to 275° F., from 225° F. to 250° F., from 250° F. to 350° F., from 250° F. to 300° F., from 250° F. to 275° F., from 275° F. to 350° F., from 275° F. to 300° F., or from 300° F. to 350° F.

The method may further include inhibiting gas hydrate formation in the pipeline after introducing the gas hydrate dissolving solution. After melting and dissolving the gas hydrate plug in the pipeline, the hydrate dissolving solution may alter the thermodynamic properties of the fluid system by adsorbing the water within the hydrocarbon fluid. Without intending to be bound by theory, this may decrease the temperature and increase the pressure required to form gas hydrates within the fluid system of the pipeline, inhibiting gas hydrate formation in the pipeline.

The gas hydrate dissolving solution may include additional additives such as corrosion inhibitors, scale inhibitors, demulsifier surfactants, or combinations thereof. These additional additives may prevent corrosion, scaling, emulsion formation, or combinations thereof.

The gas hydrate dissolving solution may be introduced into a wellbore or introduced into a pipeline. The pipeline may be a surface pipeline or a subsurface pipeline. In embodiments, the surface pipeline may be a transportation pipeline used to transport a hydrocarbon stream from a wellbore to hydrocarbon upgrading equipment such as a separator. The gas hydrate dissolving solution may be introduced by a well head, valves on the well head, an injection port in the well head, or by using back-side pumps. In embodiments, the gas hydrate dissolving solution may be introduced upstream of the gas hydrate. In embodiments, the gas hydrate dissolving solution may be introduced downstream of the gas hydrate.

The method may further include allowing the dissolved gas hydrate to discharge from the pipeline after allowing the gas hydrate dissolving solution to at least partially dissolve the gas hydrate in the pipeline.

EXAMPLES

Various embodiments of the gas hydrate dissolving solution as described in this disclosure are tested in the examples below. The gas hydrate dissolution was tested under wellhead conditions.

A gas hydrate visual cell was used to study the formation and dissolution of gas hydrate under wellhead temperature and pressure. The hydrocarbon gas mixture used in each testing had the following composition:

TABLE 1

| Hydrocarbon gas mixture composition in weight percent (wt. %) | | | | | | | | | | | | | |
|---|---|---|---|---|---|---|---|---|---|---|---|---|---|
| $C_1$ | $C_2$ | $C_3$ | $iC_4$ | $iC_5$ | $C_6$ | $C_7$ | $C_8$ | $C_9$ | $CO_2$ | $H_2S$ | $N_2$ | $nC_4$ | $nC_5$ |
| 84.24 | 4.71 | 1.39 | 0.28 | 0.19 | 0.22 | 0.18 | 0.12 | 0.04 | 2.36 | 0 | 5.68 | 0.43 | 0.16 |

The water used in each experiment was 90 vol. % fresh water and 10 vol. % formation brine. The formation brine used in each testing had the following composition:

TABLE 2

| Formation brine mixture composition in parts per million (ppm) | | | | | | | |
|---|---|---|---|---|---|---|---|
| | Na | Ca | Mg | $SO_4$ | Cl | TDS | Ba | Sr |
| Sample #1 | 47,000 | 31,700 | 1,220 | 236 | 132,000 | 212,156 | 2,239 | 2,200 |
| Sample #2 | 51,600 | 31,900 | 1,400 | 249 | 140,000 | 225,149 | 2,647 | 2,891 |

In Table 2, TDS refers to the total dissolved solids. Additionally, the pH of Sample #1 was 3.9 and the pH of Sample #2 was 3.2.

The visual cell used in the following examples measured the torque in the cell including the gas hydrate where the hydrocarbon gas, water and brine solution, and the gas hydrate dissolving solution were injected. When gas hydrate forms, the torque increases, and when the gas hydrate dissolves, the torque returns to pre-formation values. The following experiments were conducted by using the general process steps shown in Table 3.0

TABLE 3

| Visual Cell Testing Procedure |
|---|
| 1 Preparing the gas hydrate dissolving solution and the water and brine solution |
| 2 Setting the visual cell to a temperature of 100° F. |
| 3 Adding 120 mL brine to the visual cell |
| 4 Adding the hydrocarbon gas to the visual cell until a pressure of 4500 psi was achieved |
| 5 Mixing and measuring the torque |
| 6 Cooling the visual cell until a gas hydrate forms (indicated by an increase in torque and a decrease in pressure) |
| 7 Adding gas hydrate dissolving solution |
| 8 Wait for 2 hours |
| 9 Mixing and measuring the torque |
| 10 Continue adding gas hydrate dissolving solution until the gas hydrate is dissolved (indicated by a return of torque values to pre-gas hydrate formation values) |

Comparative Example 1

Comparative Example 1 includes the use of methanol as the gas hydrate dissolving solution as a basis of comparison to the gas hydrate dissolving solutions described in this disclosure. Comparative Example 1 was conducted using the steps shown in Table 4.

TABLE 4

| Comparative Example 1 Testing Procedure |
|---|
| 1 Add synthetic DI/brine (90:10) in the cell. Evacuate the cell and purge it with gas mixture to 4,500 psi and heat it up to the temperature of 100° F. |
| 2 Mix for 2 hours at 400 rpm to make fluids fully saturated with gas. Record video every 1 hour for the duration of 2 minutes from the bottom and side cameras (1 minute each). |
| 3 Stop the mixing and allow fluids to separate over 30 minutes to aid in visual observation. Record video every 15 minutes for the duration of 2 minutes from the bottom and side cameras (1 minute each). |
| 4 Restart and maintain mixing at 400 rpm. Isolate the gas reservoir from the cell (constant volume mode). Cool down the cell from 100 to 50° F. over a span of 10 hours. Record video every 1 hour for the duration of 2 minutes from the bottom and side cameras (1 minute each). |
| 5 Once 40° F. is stabilized, keep mixing at 400 rpm and 50° F. for 10 hours. Record video every 1 hour for the duration of 2 minutes from the bottom and side cameras (1 minute each). |
| 6 Stop mixing and shut in the cell at 50° F. for 10 hours. Record video every 1 hour for the duration of 2 minutes from the bottom and side cameras (1 minute each). |
| 7 Add 10 vol. % methanol and start mixing with 400 rpm for 2 hours. Record video every 30 minutes for the duration of 2 minutes from the bottom and side cameras (1 minute each). |
| 8 If the torque recorded did not decrease to normal, repeat step 7 with adding methanol in 10 vol. % injections. |
| 9 After the hydrate plug has been dissolved and plugging is cleared, heat the cell from 50 to 100° F. over a span of 5 hrs. Record video every 1 hour for the duration of 2 minutes from the bottom and side cameras (1 minute each). |

The testing for Comparative Example 1 was performed at a constant volume starting at 4500 psi. FIG. 1 shows the temperature, pressure and torque graph over time for Comparative Example 1. As shown in FIG. 1, during the cooling step from 100° F. to 50° F., the pressure decreased to 3250 psi at a constant volume. Meanwhile the torque remained in the level of 10 oz-in. However during the following mixing steps, the torque continued to increase until it exceeded the maximum operating torque, meaning that a gas hydrate was formed. The torque decreased to the initial torque value when methanol concentration increased to around 30%.

Inventive Example 1 includes the use of diethylene glycol monoethyl ether (DEGEE) as the gas hydrate dissolving solution as described in this disclosure. Inventive Example 1 was conducted using the steps shown in Table 5.

TABLE 5

Inventive Example 1 Testing Procedure

1. Add synthetic DI/brine (90:10) in the cell. Evacuate the cell and purge it with gas mixture to 4,500 psi and heat it up to the temperature of 100° F.
2. Mix for 2 hours at 400 rpm to make fluids fully saturated with gas. Record video every 1 hour for the duration of 2 minutes from the bottom and side cameras (1 minute each).
3. Stop the mixing and allow fluids to separate over 30 minutes to aid in visual observation. Record video every 15 minutes for the duration of 2 minutes from the bottom and side cameras (1 minute each).
4. Restart and maintain mixing at 400 rpm. Isolate the gas reservoir from the cell (constant volume mode). Cool down the cell from 100 to 50° F. over a span of 10 hours. Record video every 1 hour for the duration of 2 minutes from the bottom and side cameras (1 minute each).
5. Once 40° F. is stabilized, keep mixing at 400 rpm and 50° F. for 10 hours. Record video every 1 hour for the duration of 2 minutes from the bottom and side cameras (1 minute each).
6. Stop mixing and shut in the cell at 50° F. for 10 hours. Record video every 1 hour for the duration of 2 minutes from the bottom and side cameras (1 minute each).
7. Add 10 vol. % DEGEE and start mixing with 400 rpm for 2 hours. Record video every 30 minutes for the duration of 2 minutes from the bottom and side cameras (1 minute each).
8. If the torque recorded did not decrease to normal, repeat step 7 with adding DEGEE in 10 vol. % injections.
9. After the hydrate plug has been dissolved and plugging is cleared, heat the cell from 50 to 100° F. over a span of 5 hrs. Record video every 1 hour for the duration of 2 minutes from the bottom and side cameras (1 minute each).

Figure 2:
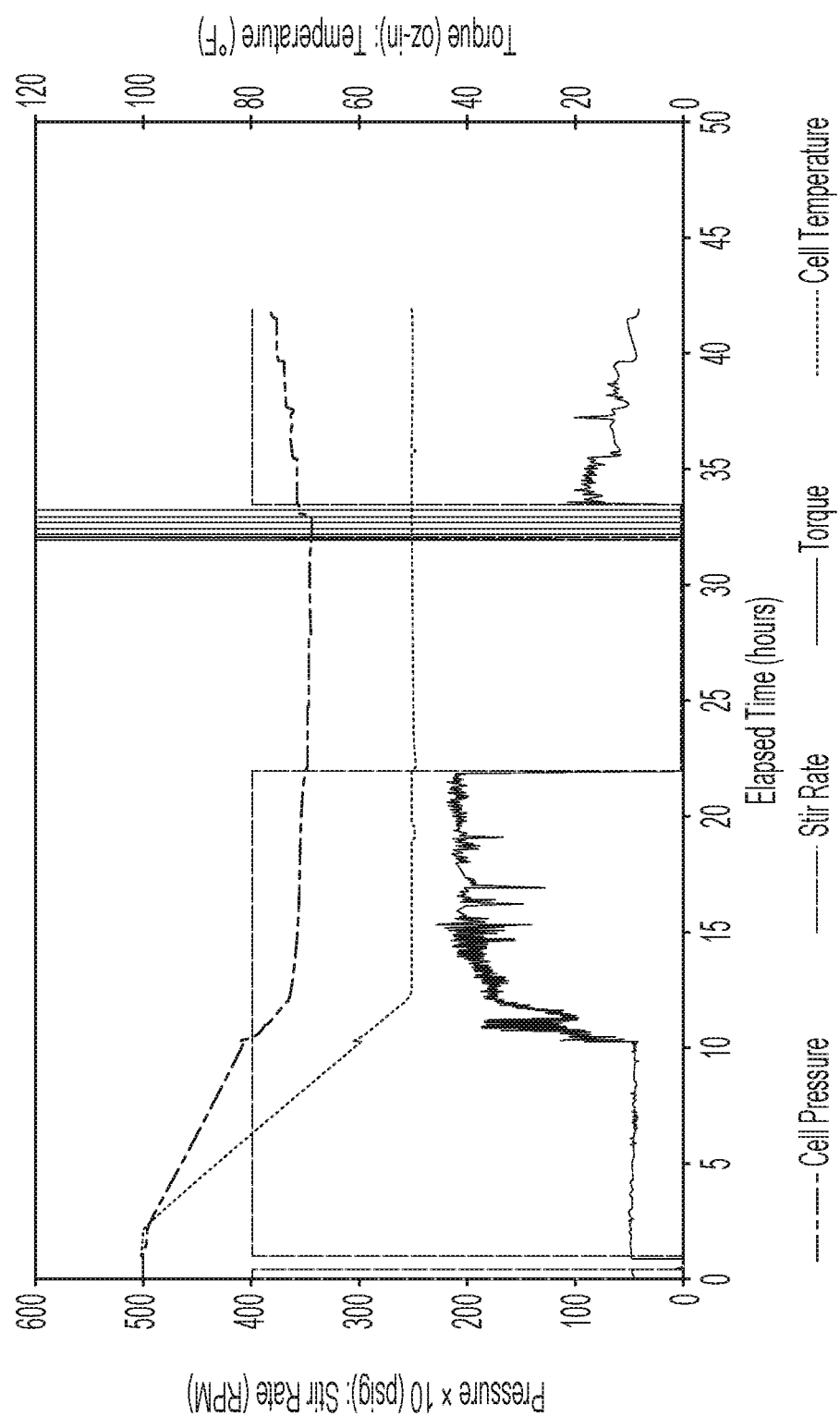
FIG. 2 graphically depicts the relationship between temperature, pressure, and torque (y-axis) and time (x-axis) during a gas hydrate experiment, according to one or more embodiments described in this disclosure.

FIG. 2 shows the temperature, pressure and torque graph over time for Inventive Example 1. Referring to FIG. 2, gas hydrates began to form at approximately 60° F. and 4060 psig. The hydrates never over torqued the mixer during the cool down and 10 hour mixing stage at 50° F. After the 10 hour shut-in phase the mixer was restarted and the hydrate plug over torqued the mixer during a 1 hour period. A 10 vol. % of DEGEE was injected and after 30 minutes the mixer was able to move the hydrate plug and a torque of 17-18 oz-in. was recorded. Then, 4 injections of 5 vol. % DEGEE were introduced into the visual cell for a total volume of 30 vol. %. Each additional injection lowered the torque until the torque returned to its original value.

Inventive Example 2 includes the use of 2-butoxyethanol as the gas hydrate dissolving solution as described in this disclosure. Inventive Example 2 was conducted using the steps shown in Table 6.

Figure 3:
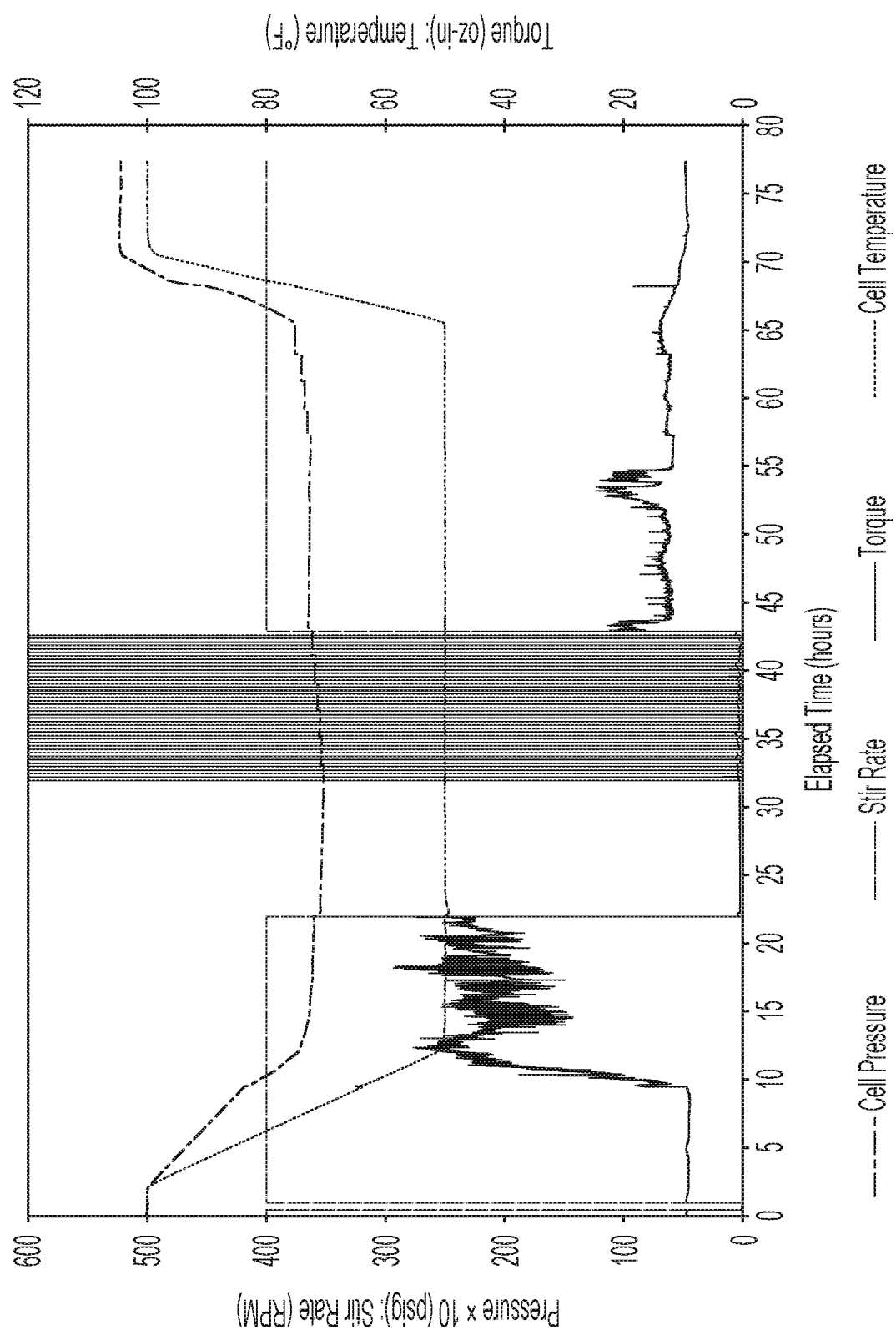
FIG. 3 graphically depicts the relationship between temperature, pressure, and torque (y-axis) and time (x-axis) during a gas hydrate experiment, according to one or more embodiments described in this disclosure.

FIG. 3 shows the temperature, pressure and torque graph over time for Inventive Example 2. Referring to FIG. 3, gas hydrates began to form during the cool down ramp at a pressure of 4189 psi and 68.3° F. Torque response varied between 40-50 oz-in during the remaining period of ramping and the 10 hour hold with mixing at 50° F. After the 10 hour shut-in period, a hydrate plug had formed and the motor over torqued at restart of mixing. After an hour, the first chemical injection of 2.5% (3 ml) was introduced. Four additional injections of 2.5 vol. % 2-butoxyethanol were then introduced into the visual cell. At approximately 1.5 hours after the 5th injection (12.5 vol. %) the hydrate plug began to breakdown and the mixer established constant rotation at 400 rpm. The resulting torque averaged 20 oz-in. A 6th injection was performed and torque dropped to 12-13 oz-in. The system was maintained at this condition overnight. Four additional chemical volumes of 2.5% each (for a total test volume of 25%) were injected the following morning with little effect to torque response.

Inventive Example 3 includes the use of potassium formate as the gas hydrate dissolving solution as described in this disclosure. Inventive Example 3 was conducted using the steps shown in Table 7.

TABLE 6

Inventive Example 2 Testing Procedure

1. Add synthetic DI/brine (90:10) in the cell. Evacuate the cell and purge it with gas mixture to 4,500 psi and heat it up to the temperature of 100° F.
2. Mix for 2 hours at 400 rpm to make fluids fully saturated with gas. Record video every 1 hour for the duration of 2 minutes from the bottom and side cameras (1 minute each).
3. Stop the mixing and allow fluids to separate over 30 minutes to aid in visual observation. Record video every 15 minutes for the duration of 2 minutes from the bottom and side cameras (1 minute each).
4. Restart and maintain mixing at 400 rpm. Isolate the gas reservoir from the cell (constant volume mode). Cool down the cell from 100 to 50° F. over a span of 10 hours. Record video every 1 hour for the duration of 2 minutes from the bottom and side cameras (1 minute each).
5. Once 40° F. is stabilized, keep mixing at 400 rpm and 50° F. for 10 hours. Record video every 1 hour for the duration of 2 minutes from the bottom and side cameras (1 minute each).
6. Stop mixing and shut in the cell at 50° F. for 10 hours. Record video every 1 hour for the duration of 2 minutes from the bottom and side cameras (1 minute each).
7. Add 2.5 vol. % 2-butoxyethanol and start mixing with 400 rpm for 2 hours. Record video every 30 minutes for the duration of 2 minutes from the bottom and side cameras (1 minute each).
8. If the torque recorded did not decrease to normal, repeat step 7 with adding 2-butoxyethanol in 2.5 vol. % injections.

TABLE 6-continued

Inventive Example 2 Testing Procedure

9  After the hydrate plug has been dissolved and plugging is cleared, heat the cell from 50 to 100° F. over a span of 5 hrs. Record video every 1 hour for the duration of 2 minutes from the bottom and side cameras (1 minute each).

TABLE 7

Inventive Example 3 Testing Procedure

1  Add synthetic DI/brine (90:10) in the cell. Evacuate the cell and purge it with gas mixture to 4,500 psi and heat it up to the temperature of 100° F.
2  Mix for 2 hours at 400 rpm to make fluids fully saturated with gas. Record video every 1 hour for the duration of 2 minutes from the bottom and side cameras (1 minute each).
3  Stop the mixing and allow fluids to separate over 30 minutes to aid in visual observation. Record video every 15 minutes for the duration of 2 minutes from the bottom and side cameras (1 minute each).
4  Restart and maintain mixing at 400 rpm. Isolate the gas reservoir from the cell (constant volume mode). Cool down the cell from 100 to 50° F. over a span of 10 hours. Record video every 1 hour for the duration of 2 minutes from the bottom and side cameras (1 minute each).
5  Once 50° F. is stabilized, keep mixing at 400 rpm and 50° F. for 10 hours. Record video every 1 hour for the duration of 2 minutes from the bottom and side cameras (1 minute each).
6  Stop mixing and shut in the cell at 50° F. for 10 hours. Record video every 1 hour for the duration of 2 minutes from the bottom and side cameras (1 minute each).
7  Add 10 vol. % potassium formate and start mixing with 400 rpm for 2 hours. Record video every 30 minutes for the duration of 2 minutes from the bottom and side cameras (1 minute each).
8  If the torque recorded did not decrease to normal, repeat step 7 with adding potassium formate in 5 vol. % injections.
9  After the hydrate plug has been dissolved and plugging is cleared, heat the cell from 50 to 100° F. over a span of 5 hrs. Record video every 1 hour for the duration of 2 minutes from the bottom and side cameras (1 minute each).

Figure 4:
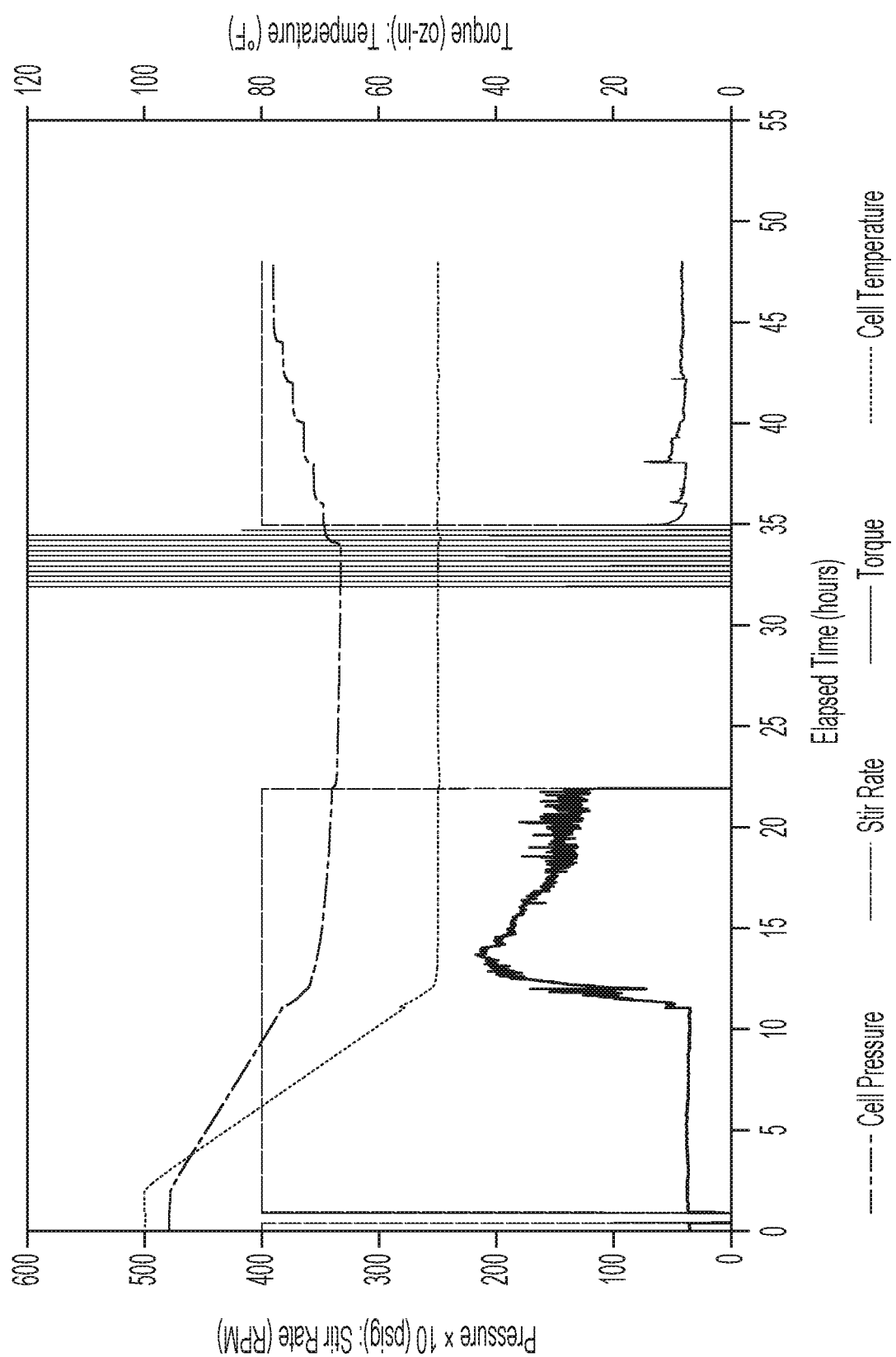
FIG. 4 graphically depicts the relationship between temperature, pressure, and torque (y-axis) and time (x-axis) during a gas hydrate experiment, according to one or more embodiments described in this disclosure.

FIG. 4 shows the temperature, pressure and torque graph over time for Inventive Example 3. Referring to FIG. 4, gas hydrates began to form at approximately 55.7° F. and 3826 psig. The hydrates never over torqued the mixer during the cool down and 10 hour mixing stage at 50° F. After the 10 hour shut-in phase the mixer was restarted and the hydrate plug over torqued the mixer during a 2 hour period; with restart attempts every 15 minutes. A 10% volume of potassium formate was injected, followed by 4 injections of 5 vol. % (duplicating the process of Inventive Example 1) and after 1 hour the mixer was able to move the hydrate plug with an initial torque of 26.4 oz-in. was recorded. After approximately 30 minutes of mixing the torque had dropped to pre-hydrate values.

Inventive Example 4 includes the use of potassium formate heated to 250° F. as the gas hydrate dissolving solution as described in this disclosure. Inventive Example 4 was conducted using the steps shown in Table 8.

Figure 5:
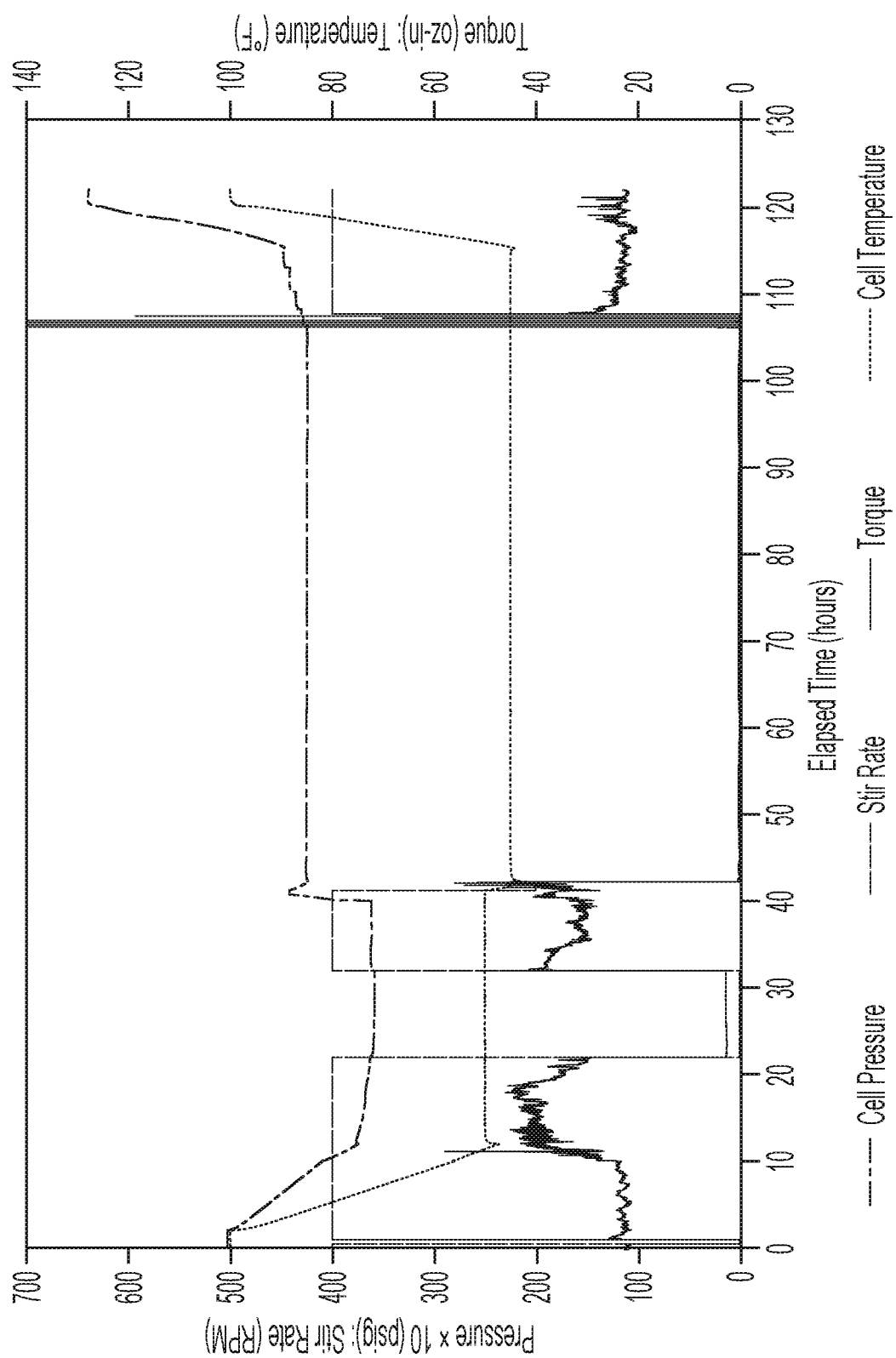
FIG. 5 graphically depicts the relationship between temperature, pressure, and torque (y-axis) and time (x-axis) during a gas hydrate experiment, according to one or more embodiments described in this disclosure.

FIG. 5 shows the temperature, pressure and torque graph over time for Inventive Example 4. Referring to FIG. 5, gas hydrates began to form during the cooling ramp at 4095 psig and 56° F. Torque increased from approximately 22-23 oz-in up to 40-45 oz-in during the completion of the cooling ramp and 10 hour mixing period at 50° F. After the 10 hour hold period, mixing was started and a torque of 40 oz-in was recorded. Torque declined and stabilized at 30-32 oz-in over the next eight hours. Chemical injection was not performed due to the lack of a hydrate plug. To achieve a hydrate plug the cell pressure was increased by injection of additional gas from 3620 psig to 4400 psig. Cell temperature was lowered from 50° F. to 45° F. and the system was held at these conditions over the weekend period. The following Monday morning the mixer was started and immediately over torqued indicating a hydrate plug had formed. The first injection of 2.5 vol. % potassium formate at a temperature of 250° F. was performed. For the first one hour and 15 minutes the mixer continued to over torque. After one hour and 30 minutes the hydrate plug broke and mixing was established with a torque recorded at 35 oz-in. The second injection took place 30 minutes later and torque dropped to 25 oz-in. The third injection lowered the torque to approximately 22 oz-in, matching the initial torque at the beginning of the test. A fourth injection had no additional reduction in torque and the test was terminated. All injections were at 2.5 vol. %.

TABLE 8

Inventive Example 4 Testing Procedure

1  Add synthetic DI/brine (90:10) in the cell. Evacuate the cell and purge it with gas mixture to 4,500 psi and heat it up to the temperature of 100° F.
2  Mix for 2 hours at 400 rpm to make fluids fully saturated with gas. Record video every 1 hour for the duration of 2 minutes from the bottom and side cameras (1 minute each).
3  Stop the mixing and allow fluids to separate over 30 minutes to aid in visual observation. Record video every 15 minutes for the duration of 2 minutes from the bottom and side cameras (1 minute each).

TABLE 8-continued

Inventive Example 4 Testing Procedure

4. Restart and maintain mixing at 400 rpm. Isolate the gas reservoir from the cell (constant volume mode). Cool down the cell from 100 to 50° F. over a span of 10 hours. Record video every 1 hour for the duration of 2 minutes from the bottom and side cameras (1 minute each).
5. Once 50° F. is stabilized, keep mixing at 400 rpm and 50° F. for 10 hours. Record video every 1 hour for the duration of 2 minutes from the bottom and side cameras (1 minute each).
6. Stop mixing and shut in the cell at 50° F. for 10 hours. Record video every 1 hour for the duration of 2 minutes from the bottom and side cameras (1 minute each).
7. Add 2.5 vol. % heated potassium formate and start mixing with 400 rpm for 2 hours. Record video every 30 minutes for the duration of 2 minutes from the bottom and side cameras (1 minute each).
8. If the torque recorded did not decrease to normal, repeat step 7 with adding heated potassium formate in 2.5 vol. % injections.
9. After the hydrate plug has been dissolved and plugging is cleared, heat the cell from 50 to 100° F. over a span of 5 hrs. Record video every 1 hour for the duration of 2 minutes from the bottom and side cameras (1 minute each).

The following description of the embodiments is illustrative in nature and is in no way intended to be limiting it its application or use. As used throughout this disclosure, the singular forms "a," "an," and "the" include plural referents unless the context clearly dictates otherwise. Thus, for example, reference to "a" component includes aspects having two or more such components, unless the context clearly indicates otherwise.

It should be apparent to those skilled in the art that various modifications and variations may be made to the embodiments described within without departing from the spirit and scope of the claimed subject matter. Thus, it is intended that the specification cover the modifications and variations of the various embodiments described within provided such modifications and variations come within the scope of the appended claims and their equivalents.

It is noted that one or more of the following claims utilize the term "in which" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising." For the purposes of defining the present technology, the transitional phrase "consisting of" may be introduced in the claims as a closed preamble term limiting the scope of the claims to the recited components or steps and any naturally occurring impurities. For the purposes of defining the present technology, the transitional phrase "consisting essentially of" may be introduced in the claims to limit the scope of one or more claims to the recited elements, components, materials, or method steps as well as any non-recited elements, components, materials, or method steps that do not materially affect the novel characteristics of the claimed subject matter. The transitional phrases "consisting of" and "consisting essentially of" may be interpreted to be subsets of the open-ended transitional phrases, such as "comprising" and "including," such that any use of an open ended phrase to introduce a recitation of a series of elements, components, materials, or steps should be interpreted to also disclose recitation of the series of elements, components, materials, or steps using the closed terms "consisting of" and "consisting essentially of." For example, the recitation of a composition "comprising" components A, B, and C should be interpreted as also disclosing a composition "consisting of" components A, B, and C as well as a composition "consisting essentially of" components A, B, and C. Any quantitative value expressed in the present application may be considered to include open-ended embodiments consistent with the transitional phrases "comprising" or "including" as well as closed or partially closed embodiments consistent with the transitional phrases "consisting of" and "consisting essentially of."

Having described the subject matter of the present disclosure in detail and by reference to specific embodiments of any of these, it is noted that the various details disclosed within should not be taken to imply that these details relate to elements that are essential components of the various embodiments described within, even in cases where a particular element is illustrated in each of the drawings that accompany the present description. Further, it should be apparent that modifications and variations are possible without departing from the scope of the present disclosure, including, but not limited to, embodiments defined in the appended claims. More specifically, although some aspects of the present disclosure are identified as particularly advantageous, it is contemplated that the present disclosure is not necessarily limited to these aspects.

What is claimed is:

1. A method of dissolving a gas hydrate in a pipeline comprising:
   introducing a gas hydrate dissolving solution into the pipeline in multiple injections, in which:
      subsequent injections of the gas hydrate dissolving solution after a first injection of the gas hydrate dissolving solution are a lesser volume of gas hydrate dissolving solution based on a total volume of water in the pipeline than the first injection,
      the gas hydrate dissolving solution comprises cesium formate, potassium formate, or both, and
      the gas hydrate dissolving solution has a flash point of greater than 50° C.; and
   allowing the gas hydrate dissolving solution to at least partially dissolve the gas hydrate in the pipeline.

2. The method of claim 1, in which introducing the gas hydrate dissolving solution comprises introducing from 2 to 7 injections of the gas hydrate dissolving solution, in which:
   the first injection is from 5 to 15 vol. % gas hydrate dissolving solution, based on a total volume of water in the pipeline;
   each remaining injection is from 3 to 7 vol. % of gas hydrate dissolving solution, based on a total volume of water in the pipeline; and each remaining injection is a lesser vol. % gas hydrate dissolving solution than the first injection.

3. The method of claim 1, in which introducing the gas hydrate dissolving solution comprises introducing from 1 to 40 vol. % gas hydrate dissolving solution, based on a total volume of water in the pipeline.

4. The method of claim 1, in which allowing the gas hydrate dissolving solution to at least partially dissolve the gas hydrate takes less than 4 hours.

5. The method of claim 1, in which allowing the gas hydrate dissolving solution to dissolve the gas hydrate takes less than 2 hours.

6. The method of claim 1, further comprising heating the gas hydrate dissolving solution prior to introducing the gas hydrate dissolving solution into the pipeline.

7. The method of claim 6, further comprising heating the gas hydrate dissolving solution to at least 100° F.

8. The method of claim 6, further comprising heating the gas hydrate dissolving solution to from 100° F. to 300° F.

9. The method of claim 6, in which introducing the gas hydrate dissolving solution comprises introducing from 2 to 5 injections of the gas hydrate dissolving solution, in which
the first injection is from 1 to 4 vol. % gas hydrate dissolving solution, based on a total volume of water in the pipeline;
each remaining injection is from 1 to 3 vol. % gas hydrate dissolving solution, based on a total volume of water in the pipeline; and
each remaining injection is a lesser vol. % gas hydrate dissolving solution than the first injection.

10. The method of claim 6, in which introducing the gas hydrate dissolving solution comprises introducing from 5 to 10 vol. % gas hydrate dissolving solution, based on a total volume of water in the pipeline.

11. The method of claim 1, in which the gas hydrate dissolving solution has a flash point of greater than 60° C.

12. The method of claim 1, in which the gas hydrate dissolving solution has a melting point of less than −15° C.

13. The method of claim 1, in which the gas hydrate dissolving solution comprises an aqueous solution comprising the cesium formate, potassium formate, or both.

14. The method of claim 1, further comprising inhibiting gas hydrate formation in the pipeline after introducing the gas hydrate dissolving solution.

15. The method of claim 1, in which a pressure of the pipeline is greater than 500 psi and a temperature of the pipeline is less than 100° F.

16. The method of claim 1, in which the gas hydrate comprises free water, carbon dioxide, hydrogen sulfide, methane, ethane, propane, n-butane, iso-butane, or combinations thereof.

17. The method of claim 1, further comprising allowing hydrocarbon fluid to flow through the pipeline during introducing the gas hydrate dissolving solution, where the hydrocarbon fluid comprises methane, ethane, propane, butane, pentane, hexane, heptane, octane, nonane, carbon dioxide, hydrogen sulfide, dinitrogen, or combinations of these.

18. The method of claim 1, further comprising allowing the dissolved gas hydrate to discharge from the pipeline after allowing the gas hydrate dissolving solution to at least partially dissolve the gas hydrate in the pipeline.

19. The method of claim 1, in which introducing the gas hydrate dissolving solution into the pipeline comprises introducing the gas hydrate dissolving solution at an injection rate of from 0.5 gal/min to 20 gal/min.

20. The method of claim 1, in which the gas hydrate dissolving solution further comprises a corrosion inhibitor, a scale inhibitor, a demulsifier, or combinations thereof.

* * * * *